Patented Sept. 27, 1927.

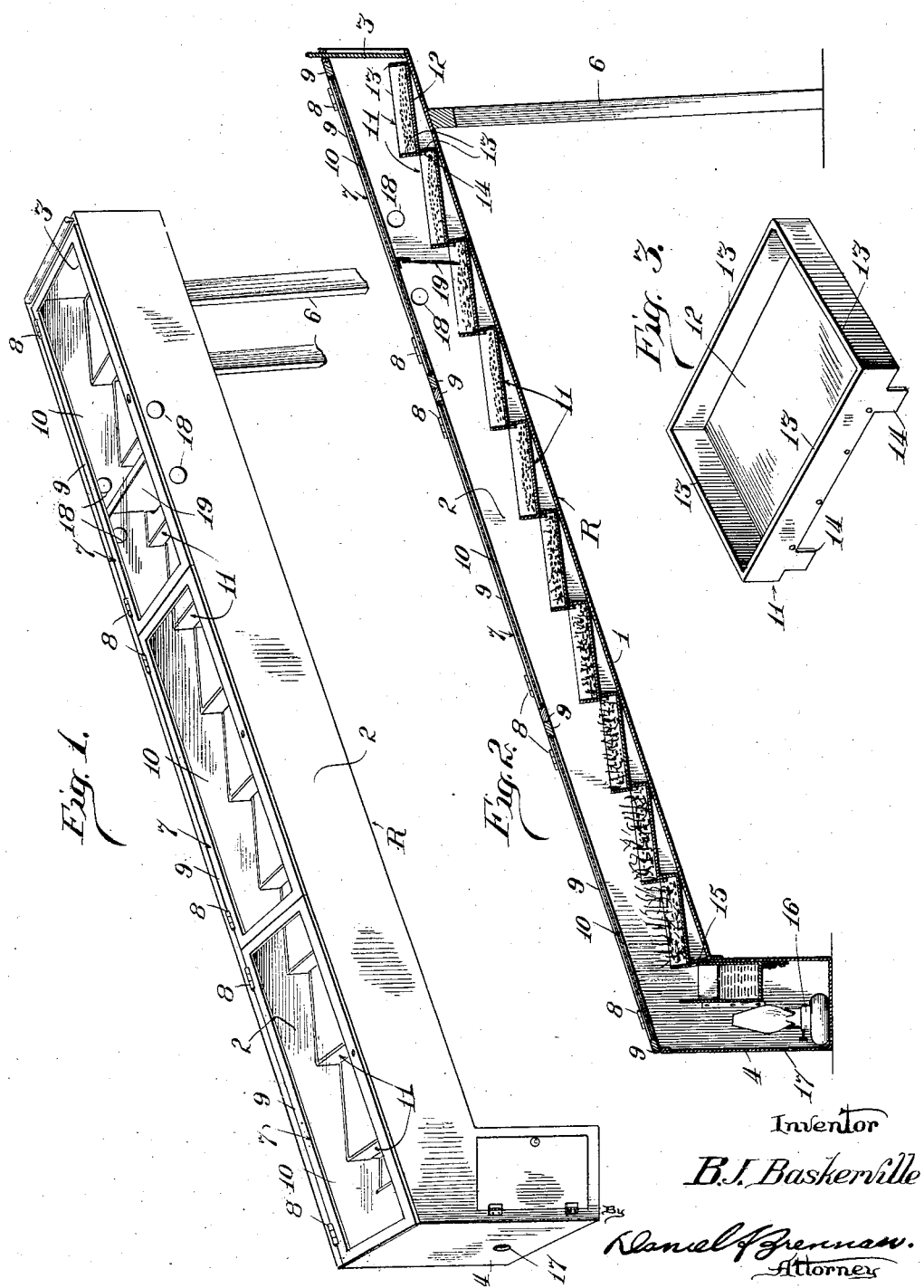

1,643,536

UNITED STATES PATENT OFFICE.

BENJAMIN J. BASKERVILLE, OF JOLIET, ILLINOIS.

GRAIN SPROUTER.

Application filed February 21, 1921. Serial No. 446,840.

This invention relates to improvements in grain sprouters.

It is an object of the invention to provide a sprouter of this character, wherein the heat artificially produced within the device is conducted from the source, so as to have the strongest effect upon the plants which have been in the sprouter the longest time, and to have the weakest effect upon the seed or berry which has been planted latest.

It is also an object of the invention to prevent the berries from rotting or souring after they have been placed into the sprouting boxes.

It is also an object of the invention to provide means in a device of this character to facilitate the sprinkling of the sprouter boxes or compartments without requiring a removal of these boxes or compartments from the device.

Another object of the invention is to combine with a collection of sprouter boxes a receptacle for water, wherein the sprinkling water not absorbed by the seed may be collected and may be removed whenever desired.

The invention also contemplates the provision of means for facilitating the circulation of air through the entire collection of sprouter boxes, and particularly to prevent the heated air from influencing in an injurious way those boxes which contain the berries of the least development.

With these and numerous other objects in view, which will become apparent from the following specification and the appended claims, the invention is described under reference to the accompanying drawings.

In the drawings:

Fig. 1 is a perspective view of the entire device;

Fig. 2 is a longitudinal, sectional view through the same, and

Fig. 3 is a perspective view of an individual sprouter box, detached.

The device consists essentially of a relatively long and narrow receptacle R having an inclined bottom wall 1, side walls 2, and an end wall or gate 3. The end wall 3, as shown in Fig. 2, may be slidable between the two side walls, and may be removed therefrom, this construction being preferable for reasons which will become apparent.

A box extension 4 is connected with one end of the receptacle R and this extension, preferably serves as a leg or support for the lower end of the entire receptacle, while the upper end of the receptacle may be supported on ordinary legs 6, or the like. The top of the receptacle is formed by a plurality of doors 7 which may be opened and closed independently of each other and which consist each of a frame 9 hinged at 8 to an edge of the receptacle, and of a glass 10, or other covering material for the frame, through which the contents of the receptacle may be inspected without requiring that the door for this purpose should be opened.

A plurality of sprouter boxes or seed trays 11 are arranged in a longitudinal series within the receptacle, all of the sprouter boxes preferably having the same size and shape and comprising a bottom 12 and the four wall flanges 13. One of the longitudinal flanges has downwardly directed lugs 14 as indicated in Fig. 3, which are adapted to engage over the adjacent wall flange of the next sprouter box.

It will be seen, therefore, that boxes of the entire series are interconnected so that the series may be movable in a predetermined direction. If, for instance, a pull is exerted on the lowermost sprouter box, all of the other sprouter boxes will be pulled in the same direction owing to the engagement of each of the boxes with the next adjacent box. The lowermost of these boxes engages with the lugs 14 over the rear wall of a receptacle 15, which is secured to the bottom extension 4 and which serves as a collector or drip pan for the sprinkling water or other fluid with which the boxes may be treated.

The bottom extension also serves for receiving the artificial source of heat shown in the embodiment here as an oil lamp 16, which is placed adjacent the receptacle and to which air is supplied through an opening 17 in the front wall of the extension. The air heated in this chamber will rise and will flow along the walls of the entire receptacle upwardly, thereby gradually transferring the heat to the various sprouter boxes and their contents, this transmission of heat, however, being effected gradually so that the lowermost boxes will be heated to a much higher degree than the boxes near the upper end of the receptacle.

For the purpose of ventilating the upper part of the receptacle and for permitting the heated air to escape, a plurality of openings 18 are provided in the side wall of the receptacle. Between one set of these openings and the next higher set, a drop curtain or partition 19, or similar obstacle, against the flow of air from the source of heat towards the upper boxes, is provided and openings in the receptacle on the opposite side of this curtain facilitate the passage of unheated fresh air through this upper portion of the receptacle.

In the operation of the device one of the boxes 11 containing the planted seed or berries and in which the berries are supported, is placed in the receptacle R at the upper end, and as the berries develop and sprout, additional boxes are planted and inserted with their contents so that the entire series of boxes is interconnected as described above. If it is then desired to remove that box which has shown a sufficient development of sprouts, this box, preferably the lowermost one (or any one of the series), may be removed and the entire series may be moved down on the bottom of the receptacle R until another one of the boxes is in engagement with the edge of the drip pan or water collector. A new box with entirely fresh grain may then be introduced near the top of the receptacle by simply pulling out the sliding end wall, and after this new box has been connected with the other ones in a manner similar to that disclosed, the end wall again may be put into place. By inserting a drop curtain or other obstacle between the boxes which have been inserted last and the boxes already in sprout, the developement of the plants takes place at the beginning very slowly only, and a rotting or souring of the grain is prevented. The air which circulates over the boxes of more advanced development is heated to a higher temperature than the air which circulates over the other boxes; the obstacle, however, is not strong enough to prevent the removal or insertion of these boxes. Thus it will be observed that the seeds are subjected, in effect, to a gradually increasing temperature, in accordance with their position, due to the approach toward the source of heat, and that the seeds are thereby developed much in the same manner as they would be when in the field. This also permits of grading the seeds, because those which fail to develop or develop more rapidly than others are easily detected and rated accordingly. The sprinkling of certain of the entire series of boxes can be effected without influencing the remainder of the boxes in the receptacle and the surplus water can readily be collected in the drip pan within the extension chamber of the receptacle.

I claim:

1. In a grain sprouter, the combination of a receptacle containing a plurality of sprouting boxes, a source of heat at one end of said receptacle, said boxes being movable along the receptacle toward the source of heat so as to bring the boxes and their contents successively into proximity to the source of heat, and said source of heat being positioned so as to affect the contents of the different boxes in different ways.

2. In a grain sprouter, a receptacle having a generally inclined position and having a bottom wall, and a plurality of detachably connected seed trays in said receptacle on said wall and arranged whereby upon removal of one of said trays the remaining trays automatically advance toward the lower end of said receptacle.

3. In a grain sprouter, a receptacle having a generally inclined position and having a bottom wall, a source of heat at the lower end of said receptacle and a plurality of detachably connected seed trays in said receptacle on said wall and arranged whereby upon removal of one of said trays the remaining trays automatically advance toward the source of heat at the lower end of said receptacle.

4. In a grain sprouter, the combination of a receptacle having an inclined bottom, a series of sprouting boxes disposed on said inclined bottom, a source of heat, and an obstacle interposed between said source of heat and the sprouting boxes which are located near the upper end of the receptacle, for limiting heat reaching such upper boxes with respect to that reaching the lower boxes.

5. In a grain sprouter, the combination of a receptacle, a source of heat therein, a longitudinal series of sprouting boxes, and an obstacle against the flow of heated air to certain of said sprouting boxes, the walls of the receptacle being provided with air openings at both sides of said obstacle.

6. In a grain sprouter, the combination of a receptacle, a source of heat therein, a plurality of sprouting boxes, a removable gate at one end of the receptacle permitting insertion of boxes into the receptacle at one end, and a partition adjacent to said gate for excluding cold air from certain of the boxes when inserting additional boxes.

7. In a device of the character described in combination, a compartment, means for supporting seeds in segregated confined limits in said compartment, a source of artificial heat and moisture in said compartment, and means for increasing the degree of heat to which said groups are subjected by progressively moving said groups toward said source of heat within said compartment.

In testimony whereof, I affix my signature.

BENJAMIN J. BASKERVILLE.